US010283951B1

(12) United States Patent
Gretz

(10) Patent No.: US 10,283,951 B1
(45) Date of Patent: May 7, 2019

(54) ELECTRICAL BOX ASSEMBLY FOR RECESSED MOUNTING OF AN ELECTRICAL COMPONENT WITHIN A CONCRETE POUR AREA

(71) Applicant: Arlington Industries, Inc., Scranton, PA (US)

(72) Inventor: Thomas J. Gretz, Delray Beach, FL (US)

(73) Assignee: ARLINGTON INDUSTRIES, INC., Scranton, PA (US)

( * ) Notice: Subject to any disclaimer, the term of this patent is extended or adjusted under 35 U.S.C. 154(b) by 129 days.

(21) Appl. No.: 15/366,626

(22) Filed: Dec. 1, 2016

Related U.S. Application Data

(63) Continuation-in-part of application No. 15/014,345, filed on Feb. 3, 2016, now Pat. No. 9,667,049.

(60) Provisional application No. 62/262,418, filed on Dec. 3, 2015.

(51) Int. Cl.
  *H02G 3/18* (2006.01)
  *H02G 3/38* (2006.01)
  *H02G 3/08* (2006.01)

(52) U.S. Cl.
  CPC ............ *H02G 3/383* (2013.01); *H02G 3/083* (2013.01); *H02G 3/088* (2013.01); *H02G 3/185* (2013.01)

(58) Field of Classification Search
  CPC ..................... H01L 2924/01079; H02G 3/185
  USPC ......................................................... 174/535
  See application file for complete search history.

(56) References Cited

U.S. PATENT DOCUMENTS

| | | | |
|---|---|---|---|
| 5,272,278 A | 12/1993 | Wuertz | |
| 5,466,886 A | 11/1995 | Lengyel et al. | |
| 5,783,774 A | 7/1998 | Bowman et al. | |
| 6,179,634 B1 | 1/2001 | Hull et al. | |
| 7,795,544 B2* | 9/2010 | Peck | H02G 3/185 |
| | | | 174/480 |
| 8,273,998 B2* | 9/2012 | Drane | H01R 24/78 |
| | | | 174/482 |
| 8,759,676 B1 | 6/2014 | Gretz | |
| 8,921,712 B1 | 12/2014 | Gretz | |
| 2006/0060368 A1* | 3/2006 | Dinh | H02G 3/185 |
| | | | 174/481 |
| 2015/0236486 A1* | 8/2015 | Dinh | H02G 3/081 |
| | | | 174/50 |
| 2016/0352087 A1* | 12/2016 | Wurms | H02G 3/383 |

* cited by examiner

*Primary Examiner* — Stanley Tso

(57) ABSTRACT

An electrical box assembly for the recessed mounting of an electrical component within a concrete pour area. The electrical box assembly includes a concrete can with an open end. A leveling ring is secured within the concrete can to provide a means of mounting an electrical component level with respect to the concrete surface. A funnel, mountable to the leveling ring, provides an electrical enclosure for enclosing the electrical component and recessing the component below the floor surface. A trim ring secures the funnel to the leveling ring and can. A cover plate closes the concrete assembly. A slot in the cover plate closes the top end of the concrete can while enabling the plug ends of electrical cords to remain installed while the cords are in use. The electrical box assembly enables protective recessed mounting of electrical components well below and level with the surface of the concrete pour.

12 Claims, 19 Drawing Sheets

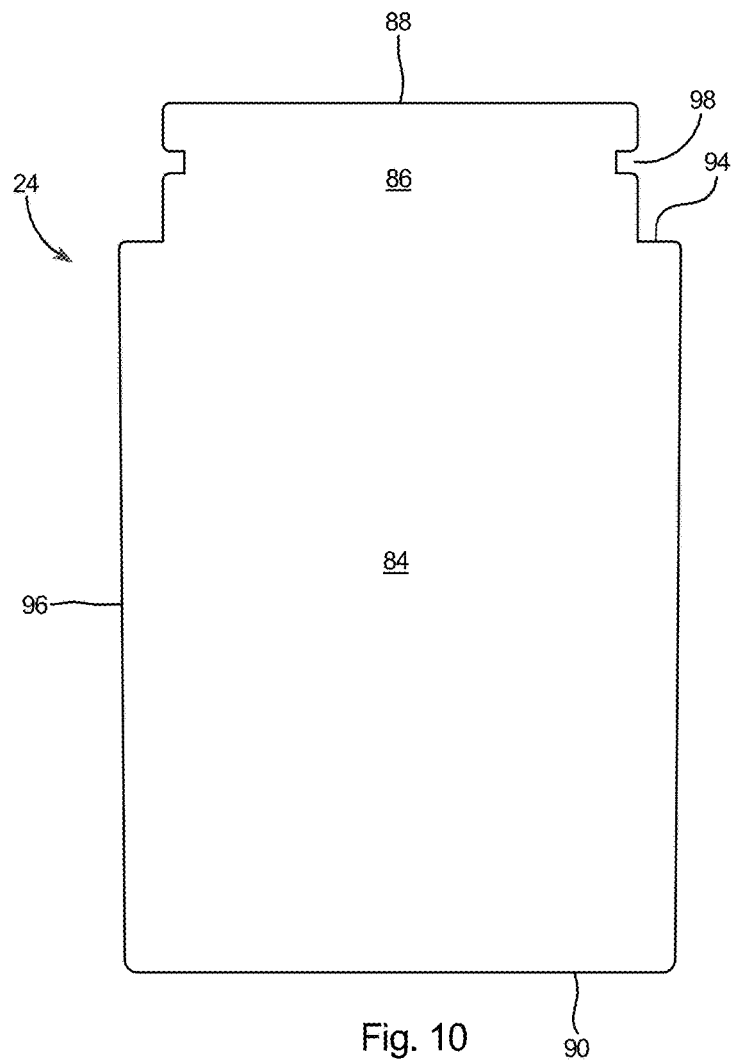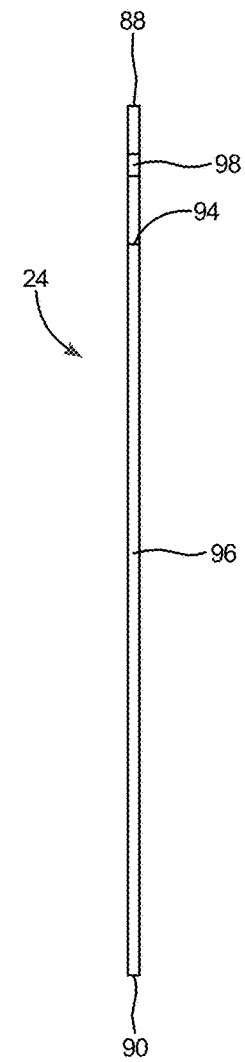
Fig. 10
Fig. 11

ELECTRICAL BOX ASSEMBLY FOR
RECESSED MOUNTING OF AN
ELECTRICAL COMPONENT WITHIN A
CONCRETE POUR AREA

This application claims priority to provisional U.S. Application No. 62/262,418, filed Dec. 3, 2015, and is a continuation in part of U.S. application Ser. No. 15/014,345, filed Feb. 3, 2016, and is incorporated herein by reference in its entirety.

FIELD OF THE INVENTION

The present invention generally relates to electrical boxes, and specifically to an electrical box for the recessed mounting of an electrical device in a poured concrete floor.

BACKGROUND OF THE INVENTION

A common desire in the pouring of concrete floors for basements, patios, and the like, is the installation of one or more electrical outlets in the concrete floor in order to provide electrical service in a given floor area. In order to meet this need, electrical boxes have been proposed for concrete pours. These boxes are placed within the forms that will receive the concrete pour and the concrete is poured around the electrical box, and, after the concrete cures, an electrical component is mounted within the box.

Although various electrical boxes have been proposed for mounting electrical components such as duplex outlets within a concrete pad, they typically mount the electrical component in close proximity to the top rim of the electrical box and, as a result, the electrical component is positioned near the surface of the concrete with minimal space between the lid and the component. As a result of the minimal space, electrical boxes for concrete pours do not provide adequate space for the plug ends of conventional electrical plugs. Conventional electrical boxes for concrete pours further do not typically include while-in-use cord entry ports to accommodate electrical cords while they are plugged in to supply power to various pieces of equipment.

What is needed therefore is an improved electrical box for concrete pours that enables recessed mounting of an electrical component, including a large volume for accommodating the plug ends of electrical cords above the component but beneath the floor surface. Furthermore, what is needed is an electrical box that enables the electrical cords to remain plugged into the box while a lid covers the box. Recessing the plug ends of the electrical cords reduces the possibility of the plug ends being contacted, stumbled over, or mistakenly knocked out by a passerby. Reading of the following description with reference to the included drawings will make clear these and other advantages provided by the electrical box assembly of the present invention.

BRIEF SUMMARY OF THE INVENTION

The current invention is an electrical box assembly for the recessed mounting of an electrical component within a concrete pour. The electrical box assembly includes a non-metallic concrete can with an open end and a plurality of hubs with integral sockets for connection of electrical conduit thereto. Plugs are provided for closing off unused sockets. A leveling ring is secured within the concrete can to provide a means of mounting an electrical component level with respect to the concrete surface. A funnel, mountable to the leveling ring, provides an electrical enclosure for enclosing the electrical component and recessing the component below the floor surface. A trim ring secures the funnel to the leveling ring and can. A cover plate closes the concrete assembly. A gasket may be used to provide a seal between the cover plate and the can. A slot is included in the cover plate to close the top end of the concrete can while enabling the plug ends of electrical cords to remain installed while the cords are in use. The electrical box assembly enables recessing of electrical components well below the concrete surface, thereby protecting the components from being accidentally dislodged.

OBJECTS AND ADVANTAGES

The electrical box assembly for concrete poured floors provides several advantages over the prior art, including:
1) The electrical box assembly enables recessed mounting of an electrical component below the surface of a poured concrete floor
2) The electrical box assembly includes means for leveling an electrical component with respect to the concrete surface.
3) The concrete can portion of the electrical box assembly includes rigid walls having the strength and integrity to withstand immersion in poured concrete without crushing or damaging the can.
4) The electrical box assembly is constructed of materials that are not susceptible to corrosion damage caused by moisture or water seepage.

These and other objects and advantages of the present invention will be better understood by reading the following description along with reference to the drawings.

BRIEF DESCRIPTION OF THE SEVERAL
VIEWS OF THE DRAWING(S)

Reference is made herein to the accompanying drawings, which are not necessarily drawn to scale, and wherein:

FIG. 10 is a front elevation view of a slide that forms a portion of the electrical box assembly of FIG. 1.

FIG. 11 is a side view of the slide of FIG. 10.

DETAILED DESCRIPTION

Figure 1:
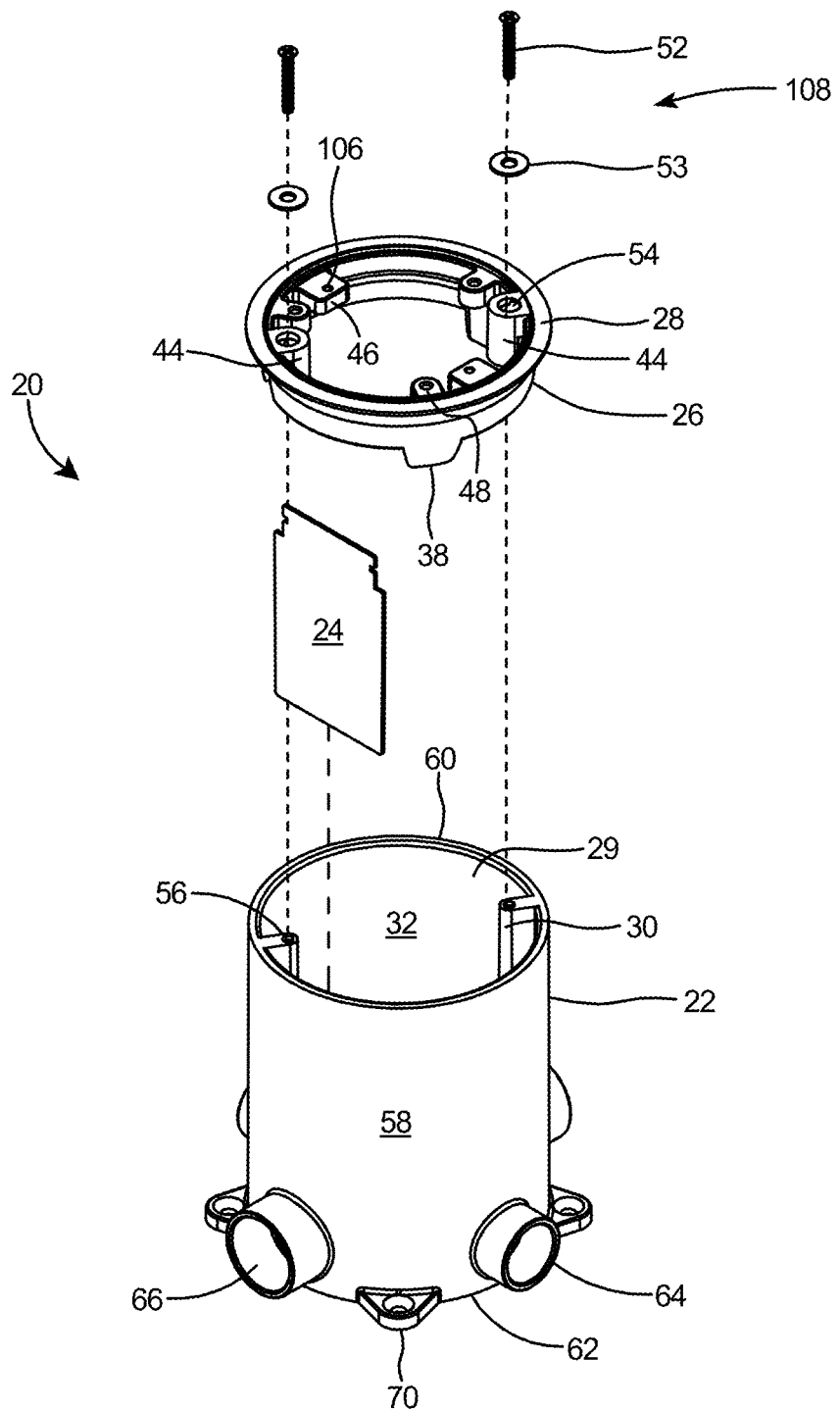
FIG. 1 is an exploded isometric view of a first embodiment of an electrical box assembly for poured concrete floors, in accordance with embodiments of the invention.

With reference to FIG. 1, there is shown an electrical box assembly 20 for concrete pours according to the present invention. The electrical box assembly 20 includes an electrical box or concrete can 22 and an optional slide member 24 for dividing the electrical box into low voltage and high voltage compartments. The electrical box assembly can be configured to mount a conventional electrical cover (not shown), including either a flat electrical cover or a conventional pop-up style electrical cover, to the electrical box 22. The electrical box assembly 20 further depicts a leveling ring 26 for installing an electrical component (not shown) and an electrical cover to the electrical box. For leveling an electrical component such as a duplex receptacle (not shown), with respect to the electrical box 22, the leveling ring 26 includes a flange 28 and the electrical box includes an electrical enclosure 29 and mounting bosses 30 extending along the entire length of the inner surface 32 of the electrical box.

Figure 6:
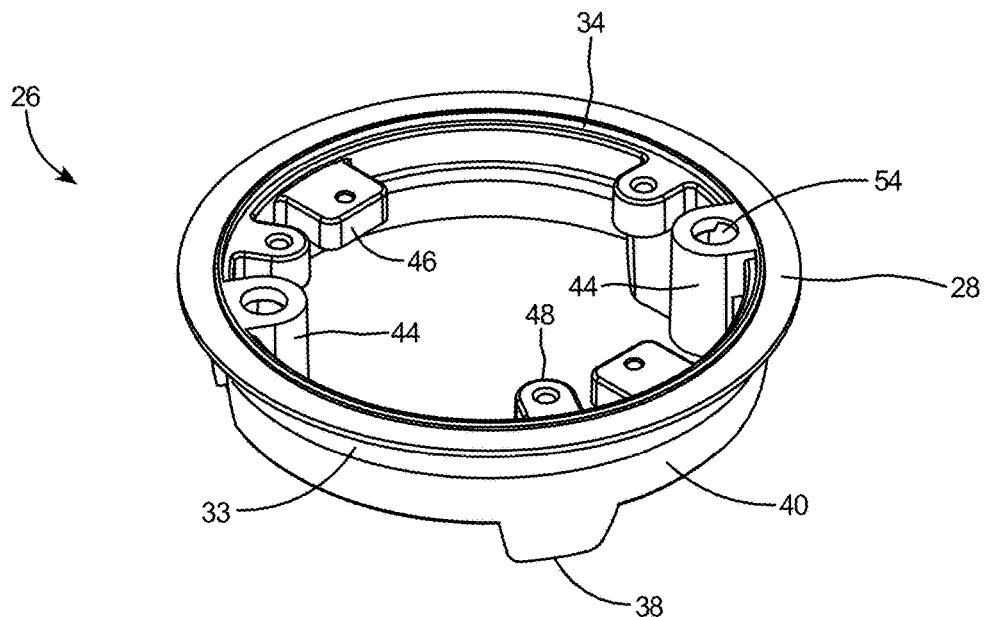
FIG. 6 is a top isometric view of a leveling ring that forms a portion of the electrical box assembly of FIG. 1.
Figure 7:
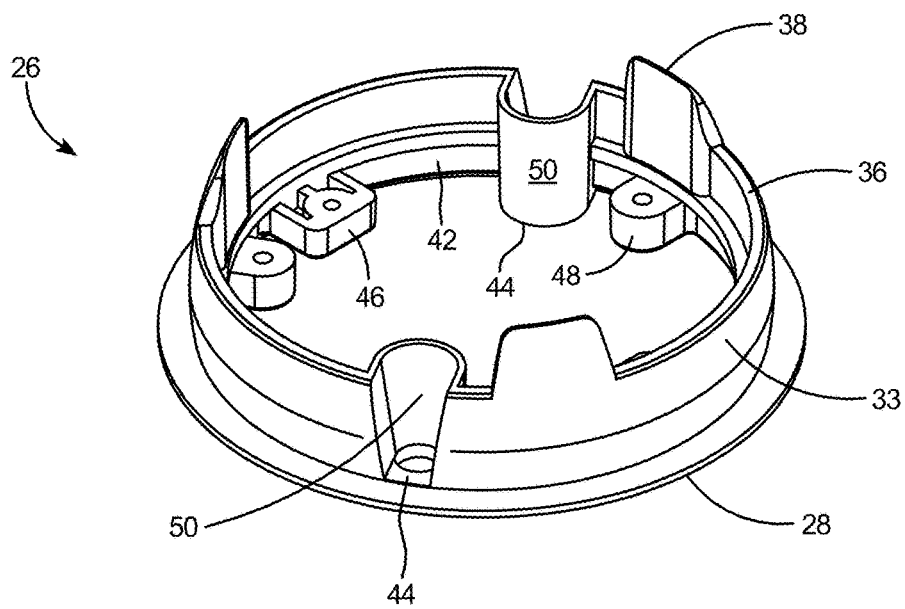
FIG. 7 is a bottom isometric view of the leveling ring.

Referring to FIGS. 6-7, the leveling ring 26 includes a ring body 33, a top surface 34, a lower surface 36, and at least one leg 38 extending downward from the lower surface 36. The leveling ring 26 further includes an outer periphery 40 and an inner periphery 42. The flange 28 extends from the outer periphery 40 of the ring. A leveling ring attachment boss 44, a component attachment arm 46, and a cover attachment boss 48 extend from the inner periphery 42 of the leveling ring 26. Skirts 50 are formed in the ring body 33 around the leveling ring attachment bosses 44, with the skirts 50 extending inward of the inner periphery 42 of ring body 33. Ring body 33 has a substantially circular outer periphery 40 in order for outer periphery 40 to nest within the electrical enclosure 29 of the electrical box.

Figure 2:
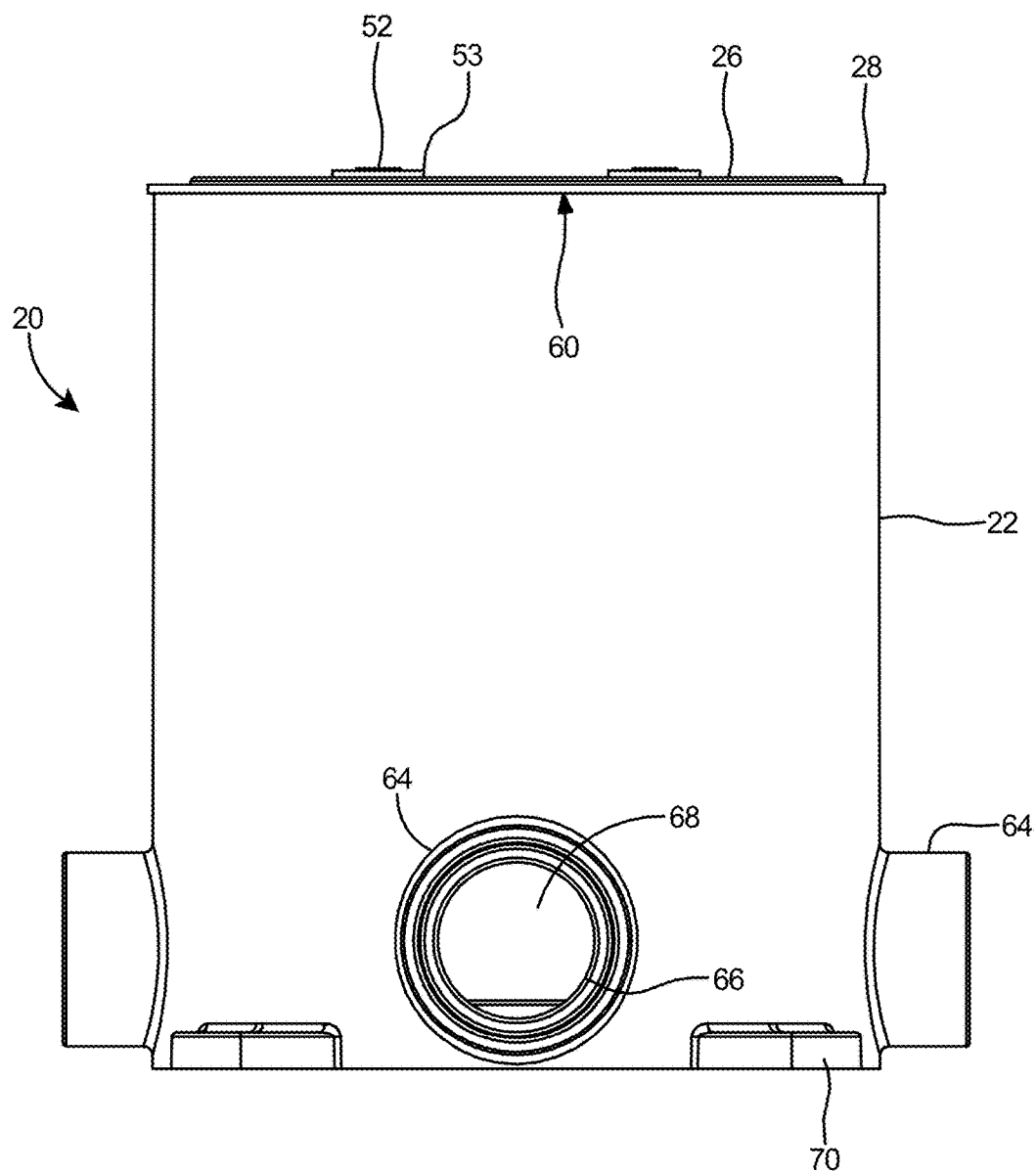
FIG. 2 is a side view of an electrical box that forms a portion of the electrical box assembly of FIG. 1.

Referring to FIGS. 1 and 2, leveling ring 26 is secured to electrical box 22 by mounting fasteners 52 secured through washers 53 and through apertures 54 of leveling ring bosses 44 into bores 56 of mounting bosses 30 of electrical box. Electrical box 22 includes a sidewall 58 including a rim 60, a bottom 62, and one or more hubs 64 extending from the sidewall 58 near the bottom 62 of the box. Each hub 64 includes a conduit seat 66 therein to enable the connection of electrical conduit (not shown) thereto and a cable opening 68 (see FIG. 5) to enable insertion of wiring leads (not shown) from the electrical cable into the electrical enclosure 29 of the electrical box. One or more feet 70 extend from the bottom 62 of the electrical box 22, and, as shown in FIG. 3, the feet 70 include apertures 72 therein for anchoring the electrical box to the earth, such as by rebar or similar fasteners (not shown).

Figure 3:
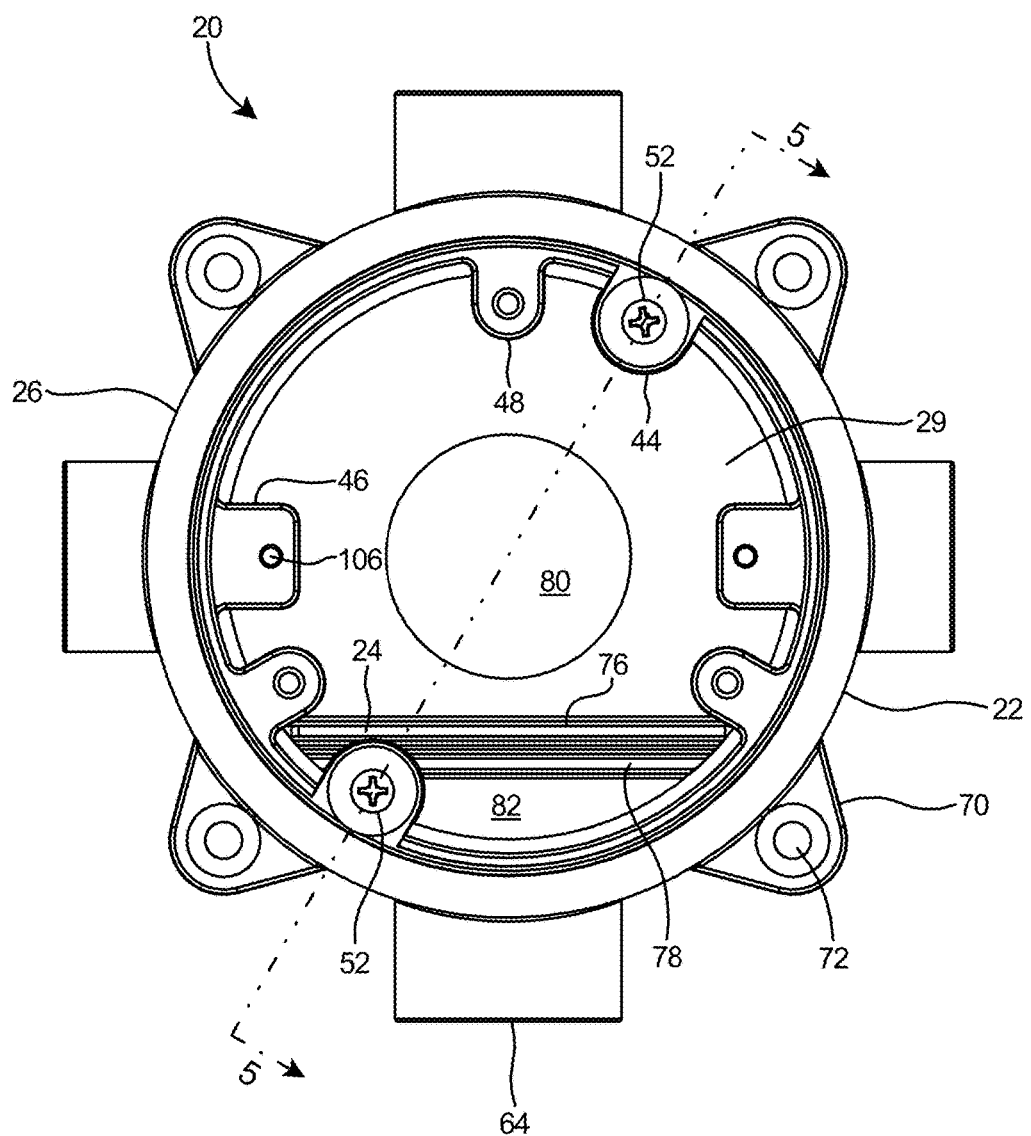
FIG. 3 is a top view of the electrical box assembly of FIG. 1, with the leveling ring secured to the electrical box.
Figure 4:
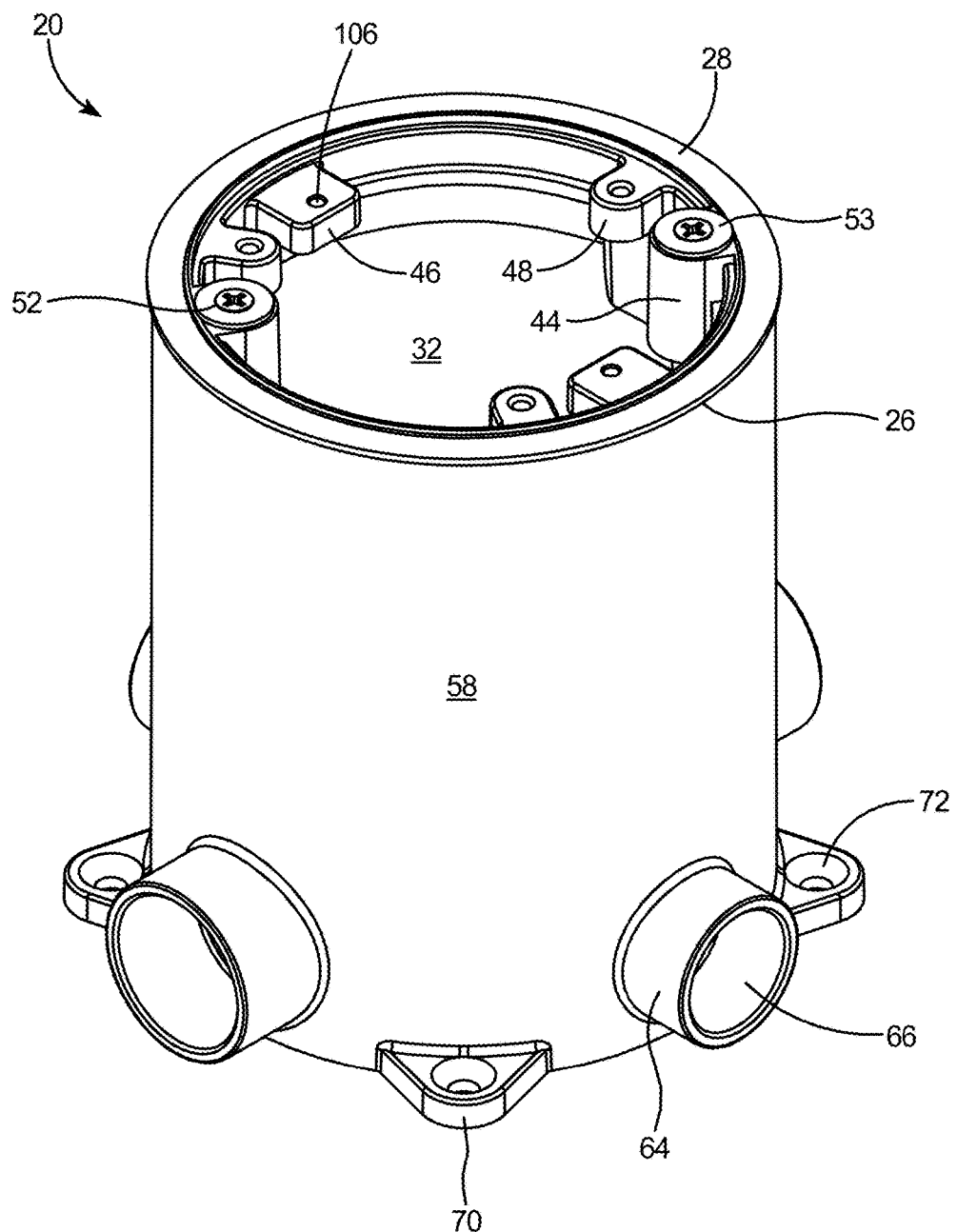
FIG. 4 is an isometric view of electrical box assembly of FIG. 1, with the leveling ring secured to the electrical box.

With reference to FIGS. 2 and 3, when secured to electrical box 22, flange 28 of leveling ring 26 is flush with the rim 60 of electrical box. Mounting fasteners 52 extend through leveling ring attachment bosses 44 of leveling ring 26 to secure the leveling ring to the electrical box 22. As shown in FIG. 3, two rails 76, typically molded into the interior of electrical box 22 and extending from the inner surface 32 of the sidewall 58 of the box, form a channel 78 for accepting the optional slide member 24 for dividing the electrical box electrical enclosure 29 into a separate high voltage compartment 80 and low voltage compartment 82 if desired.

Figure 5:
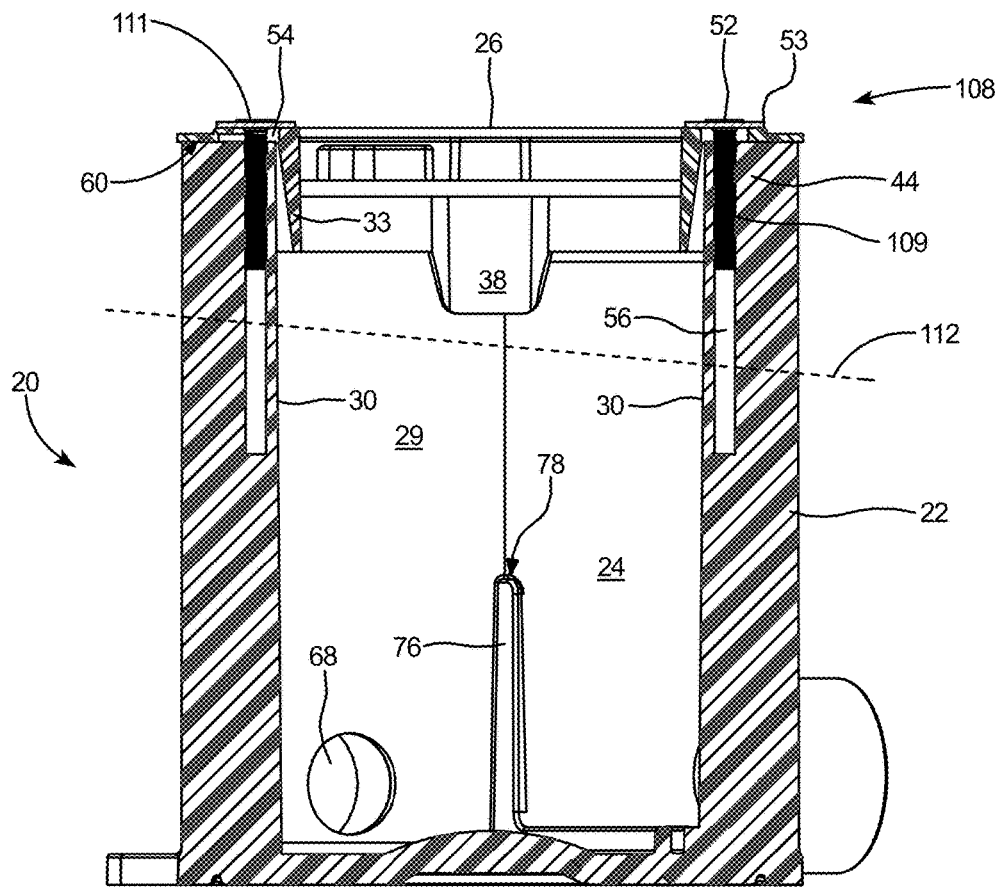
FIG. 5 is a sectional view of the electrical box assembly taken along line 5-5 of FIG. 3.

As shown in FIGS. 10 and 11, the slide member 24 includes a body 84, a narrowed head portion 86, a top edge 88, a bottom edge 90, a shoulder 94, side edges 96, and notches 98 on opposing sides of the body 84. As shown in FIG. 5, when inserted into the channel 78, the slide member 24 extends substantially to the rim 60 of the electrical box 22.

Figure 8:
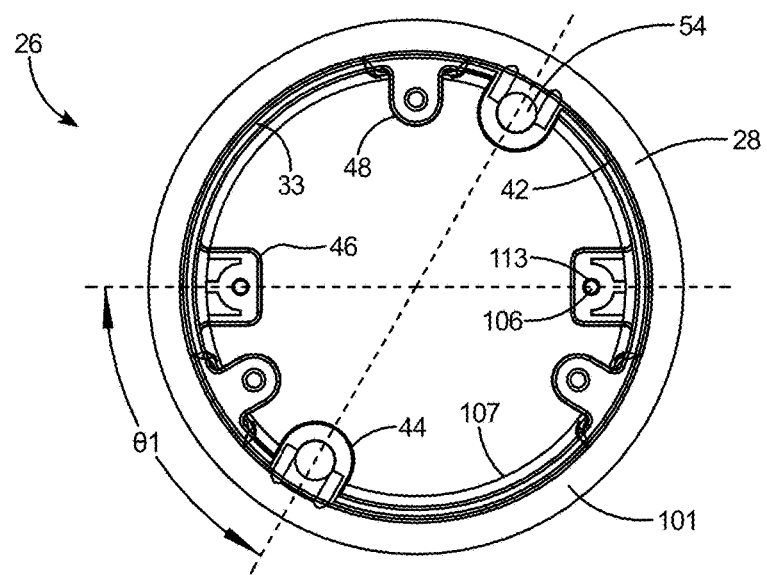
FIG. 8 is a top view of the leveling ring.
Figure 9:
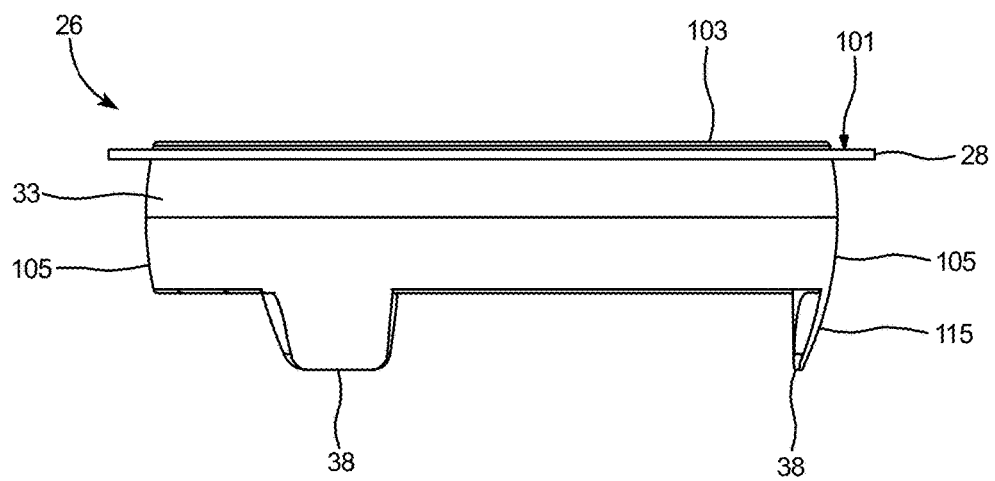
FIG. 9 is a side view of the leveling ring.

With reference to FIGS. 8 and 9, leveling ring 26 further includes an upper surface 101, a lip 103 extending upward from the upper surface inward of the flange 28, and an arcuate outer surface 105. A collar 107 extends inward around the entirety of the inner periphery 42 of the ring. Preferably there are two component attachment arms 46 extending inward from the inner periphery 42 of the ring, each of the component attachment arms 46 including a bore 106 therein. Preferably, the two component attachment arms 46 are arranged 180 degrees apart on opposing sides of the inner periphery. Arcuate outer surface 105 of ring facilitates a snug fit of the ring 26 within the sidewall 58 of the electrical box, and also enables slight tilting of the leveling ring 26 with respect to the rim 60 (see FIG. 1) of the electrical box 22.

With reference to FIG. 8, most preferably there are three cover attachment bosses 48 extending from the inner periphery 42 of the leveling ring 26. The cover attachment bosses 48 are spaced 120 degrees apart around the inner periphery 42 of the leveling ring 26. Most preferably the component attachment arms 46 are spaced 180 degrees apart on the ring 26. Preferably, the angle θ1 between each leveling ring attachment boss 44 and the adjacent component attachment arm 46 is between 50 and 70 degrees, and most preferably angle θ1 is 60 degrees.

As shown in FIG. 5, mounting bosses 30 extend along the entire length of the inner surface 32 of the electrical box 22. Preferably, the electrical box 22 and the integral mounting bosses 30 are molded in one piece of plastic. The mounting arrangement 108 for mounting leveling ring 26 to electrical box 22 includes the fasteners 52, washers 53, and the mounting bosses 30 with bores 56 therein. Fasteners 52 include threaded shanks 109 and heads 111. If, after the concrete is poured, the electrical box is not plumb, the installer may cut off the electrical box with a saw or similar tool to create a top surface on the box 22 that is substantially flush with the concrete. Thus electrical box 22 and bosses 30 can be cut at an angle, such as along line 112 in FIG. 5, to be flush with the concrete surface and the mounting arrangement 108 will self-adjust to mount leveling ring 26 flush with the newly cut rim 60 of the box 22. Most preferably, the apertures 54 in flange 28 are oversize apertures, which enable the threaded shanks 109 of fasteners 52 to pass through but which the heads 111 of the fasteners cannot pass through.

Referring to FIG. 8, most preferably the component attachment arms 46 include an insert 113 pressed within each of the bores 106 therein in the component attachment arms 46 of the leveling ring 26. As shown in FIG. 9, the leg 38 of the leveling ring 26 includes an arcuate outer surface 115 that is coextensive with the arcuate outer surface 105 of the leveling ring 26.

With reference to FIG. 1, the material of construction of the electrical box 22, slide member 24, and leveling ring 26 is plastic. Most preferably, each of these elements are molded in one piece of plastic, with the inserts 113 pressed into apertures 106 in the component attachment arms 46 of leveling ring 26 (see FIG. 8). Most preferably, the electrical box 22, slide member 24, and leveling ring 26 are each constructed of polyvinyl chloride (PVC).

Figure 12:
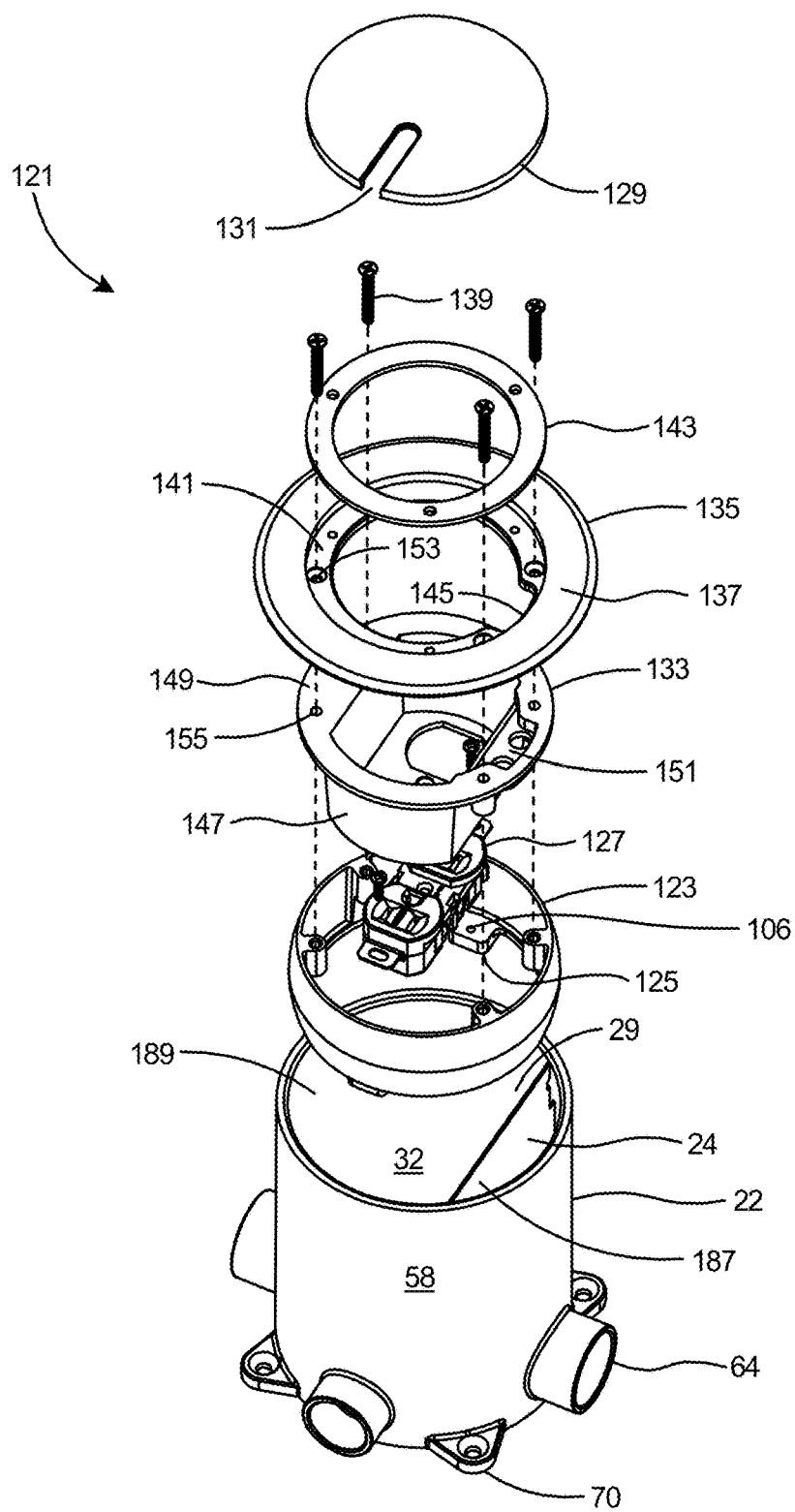
FIG. 12 is an exploded isometric view of a second and preferred embodiment of an electrical box assembly for poured concrete floors according to the present invention.

Referring to FIG. 12, a second and preferred embodiment of the electrical box assembly 121 includes an electrical box or concrete can 22 having a sidewall 58 and an inner surface 32 defining an electrical enclosure 29. An optional slide member 24 is provided for dividing the electrical box into low voltage and high voltage compartments. The electrical box assembly 121 further depicts a deep leveling ring 123 with arms 125 for installing an electrical component 127 and an electrical cover 129 to the electrical box. Arms 125 include apertures 106 therein adapted for mounting of the electrical component 127. The cover 129 depicted in FIG. 12 is a non-metallic blank cover with a slot 131 that provides an opening for electrical cords (not shown) to pass into the electrical enclosure 29 while cover 129 is closed on electrical box 22. The cover 129 can be replaced at the job site with a conventional metal or plastic cover if preferred.

Electrical box assembly 121 further includes a funnel 133 for insertion within the leveling ring 123 and sealing around the electrical component 127. A trim ring 135 mounts to the funnel 133 and includes an outward extending flange 137 that will extend beyond the periphery of electrical box 22 and will overlap a surrounding concrete or similar surface (not shown) in which the box is mounted. Fasteners 139 secure the trim ring 135 to the funnel 133. Trim ring 135 includes a collar 141 which is recessed with respect to flange 137 and is capable of accepting a gasket 143. Collar 141 of trim ring 135 includes a notch 145 that extends to the inner periphery of flange 137. Funnel 133 includes a body 147 having a flange 149 and a recess 151 within the flange. Bores 153 in collar 141 of trim ring 135 are patterned to align with bores 155 in flange 149 of funnel 133 such that notch 145 in trim ring 135 will align with recess 151 of funnel.

Figure 13:
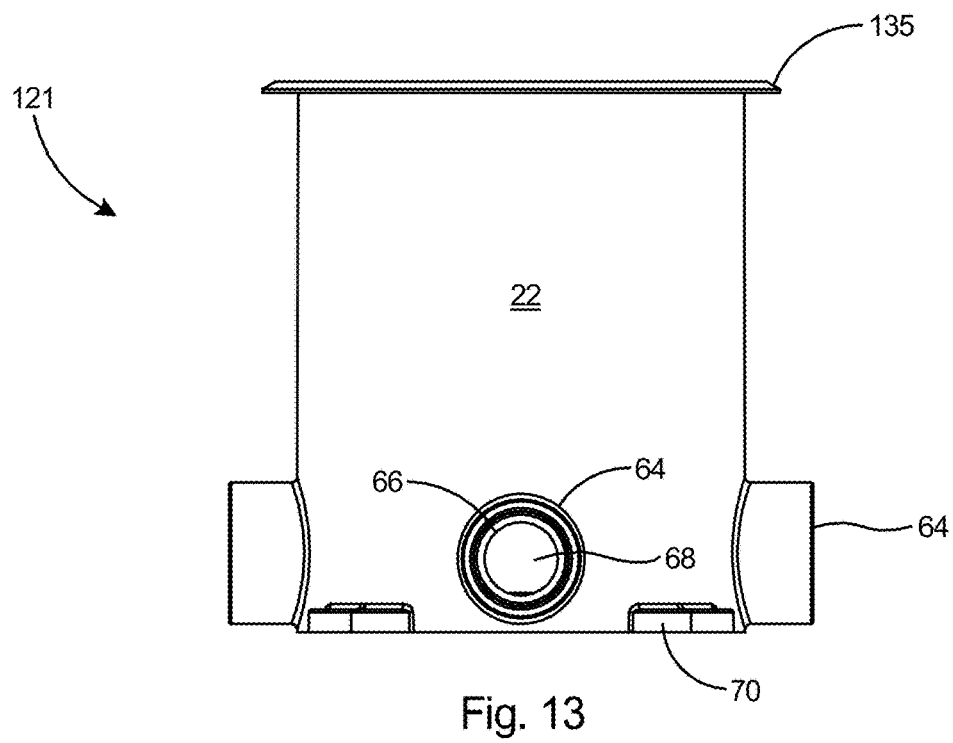
FIG. 13 is a side view of an electrical box that forms a portion of the electrical box assembly of FIG. 1.
Figure 14:
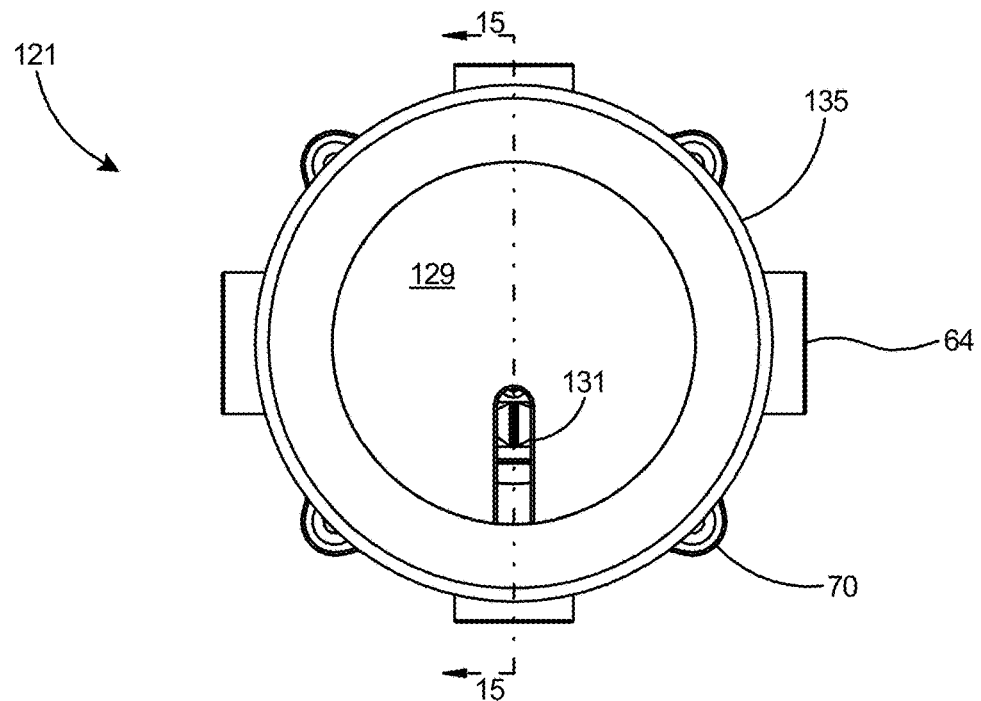
FIG. 14 is a top view of the electrical box assembly of FIG. 1.
Figure 15:
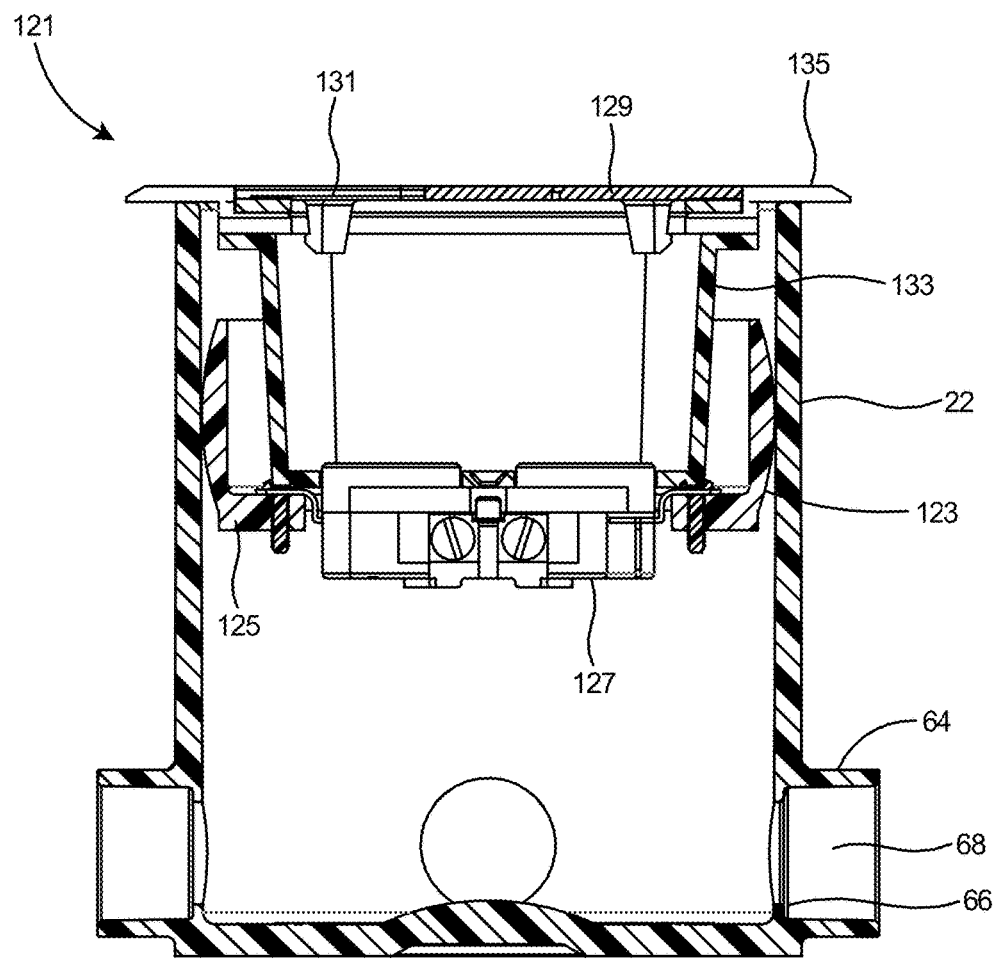
FIG. 15 is a sectional view of the electrical box assembly taken along line 15-15 of FIG. 14.
Figure 16:
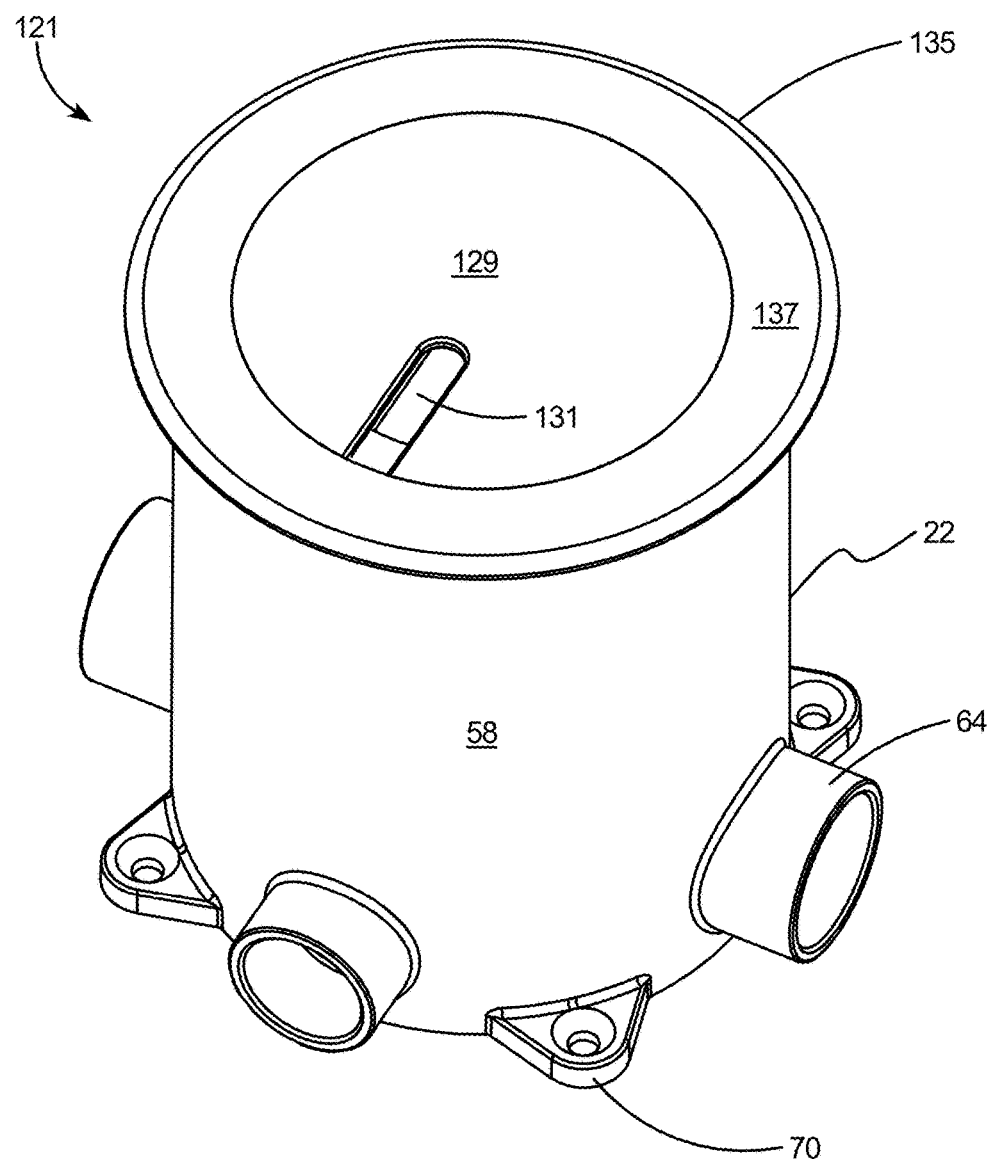
FIG. 16 is an isometric view of electrical box assembly of FIG. 1.

With reference to FIGS. 13 and 14, electrical box assembly 121 may further include one or more hubs 64 extending from the electrical box 22. Hubs 64 include a cable seat 66 and cable opening 68 therein.

Figure 17:
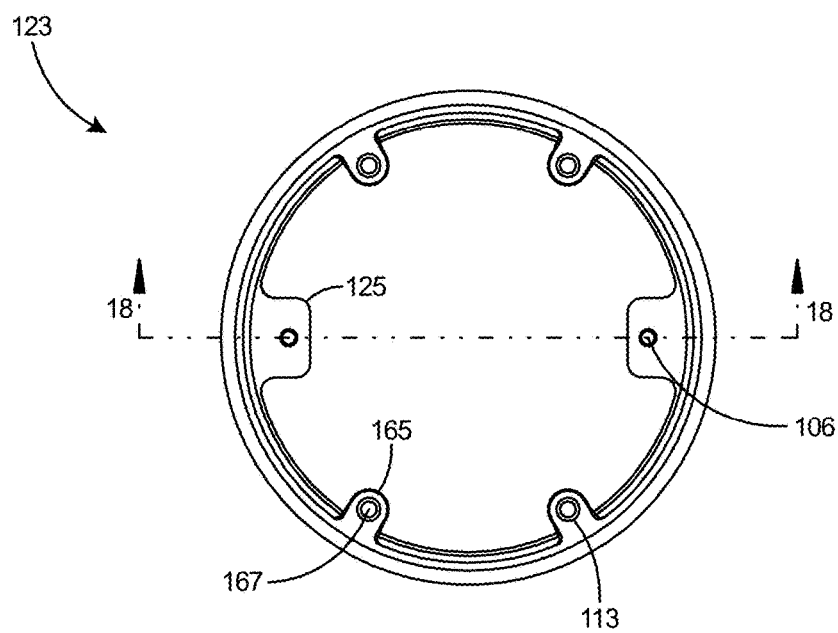
FIG. 17 is a plan view of a leveling ring that forms a portion of the electrical box assembly of FIG. 12.
Figure 18:
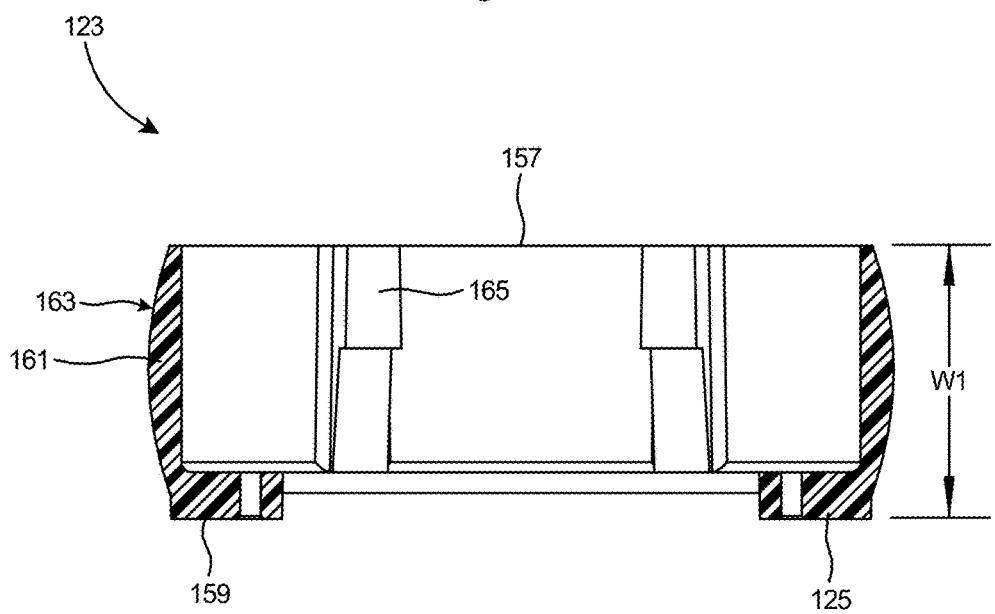
FIG. 18 is a sectional view of the leveling ring taken along line 18-18 of FIG. 17.
Figure 19:
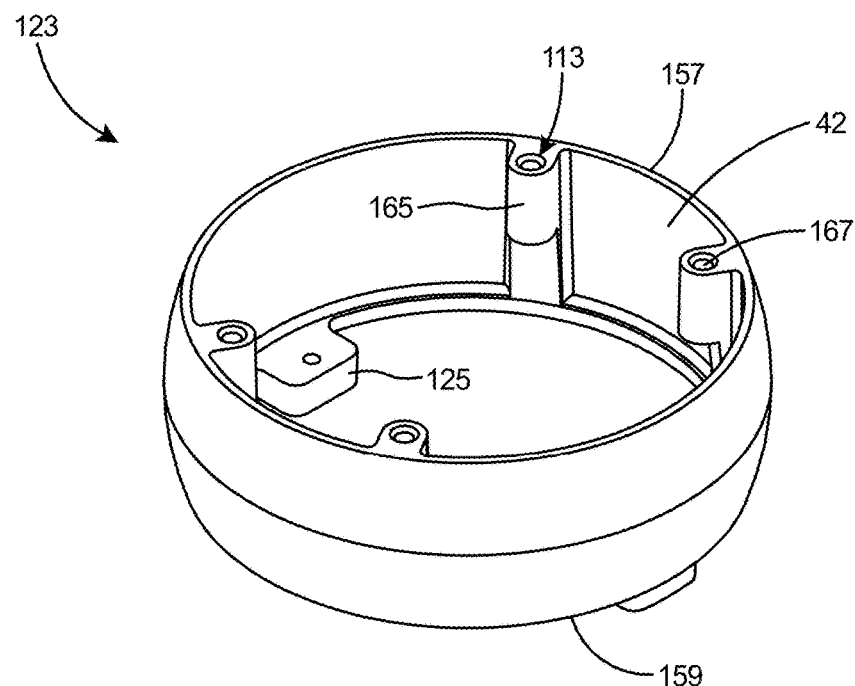
FIG. 19 is a top isometric view of the leveling ring of FIG. 12.
Figure 20:
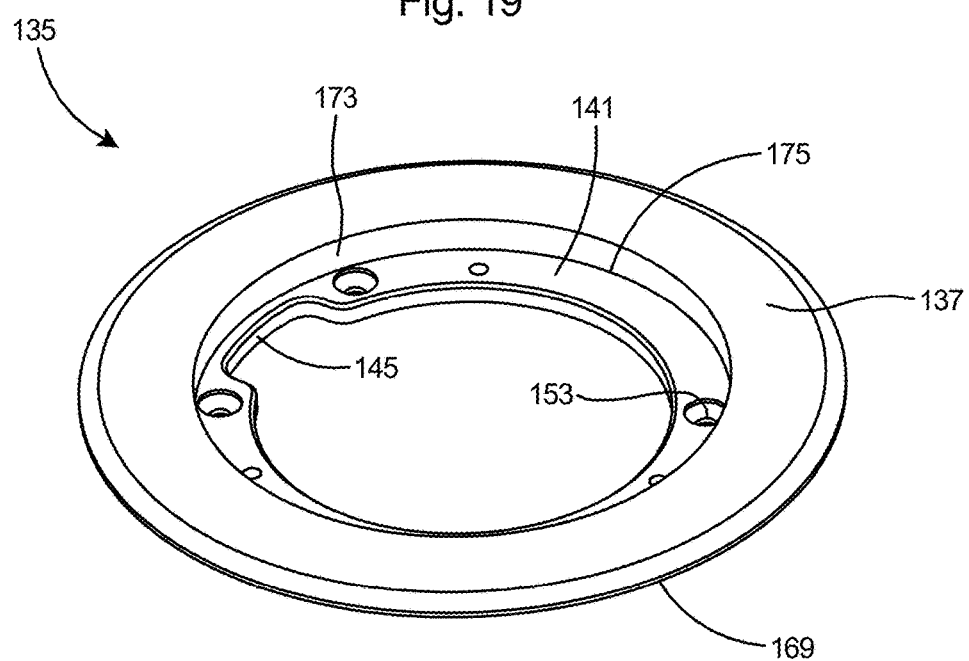
FIG. 20 is an isometric view of a trim ring that forms a portion of the electrical box assembly of FIG. 12.
Figure 21:
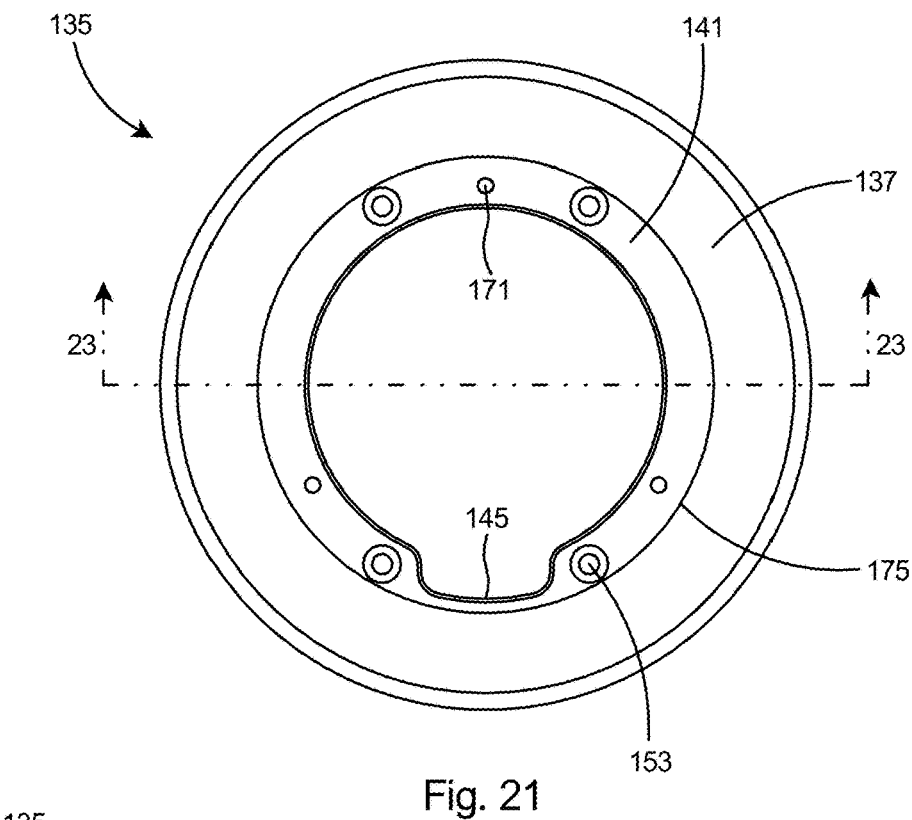
FIG. 21 is a top plan view of the trim ring.

Referring to FIGS. 17-19, leveling ring 123 is a deep leveling ring with an inner periphery 42 and a substantial width W1 between the ring's top edge 157 and bottom edge 159. The leveling ring includes a sidewall 161 with an arcuate outer surface 163. Bosses 165 include bores 167 and inserts 113 pressed within each of the bores 167.

Figure 22:
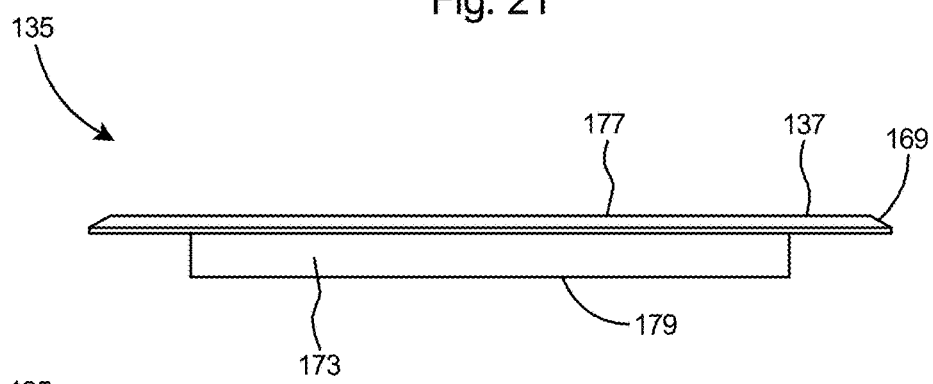
FIG. 22 is a side view of the trim ring.
Figure 23:
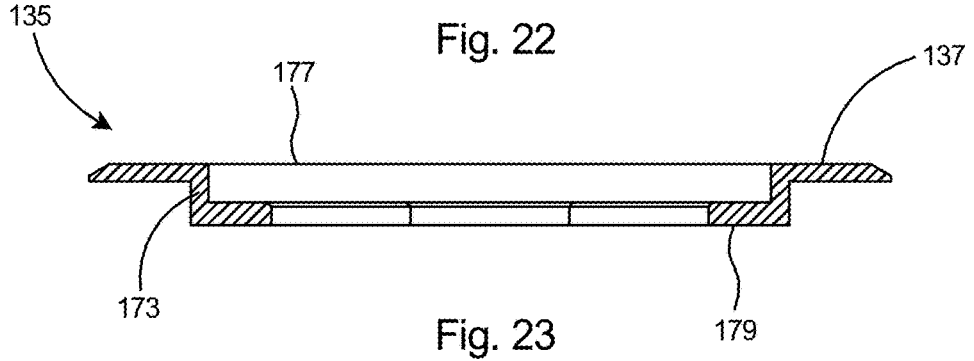
FIG. 23 is a sectional view of the trim ring taken along line 23-23 of FIG. 21.

With reference to FIGS. 20-23, trim ring 135 includes the flange 137, an outer edge 169, collar 141 recessed away from the flange 137, bores 153 for mounting fasteners (not shown) for mounting the trim ring to the electrical box assembly, and apertures 171 for mounting of a conventional cover plate to the trim ring 135 and electrical box assembly. A recessed wall 173 extends around the outer edge 175 and connects flange 137 to collar 141. Trim ring 135 includes an upper edge 177 and lower edge 179 as shown in FIG. 22.

Figure 24:
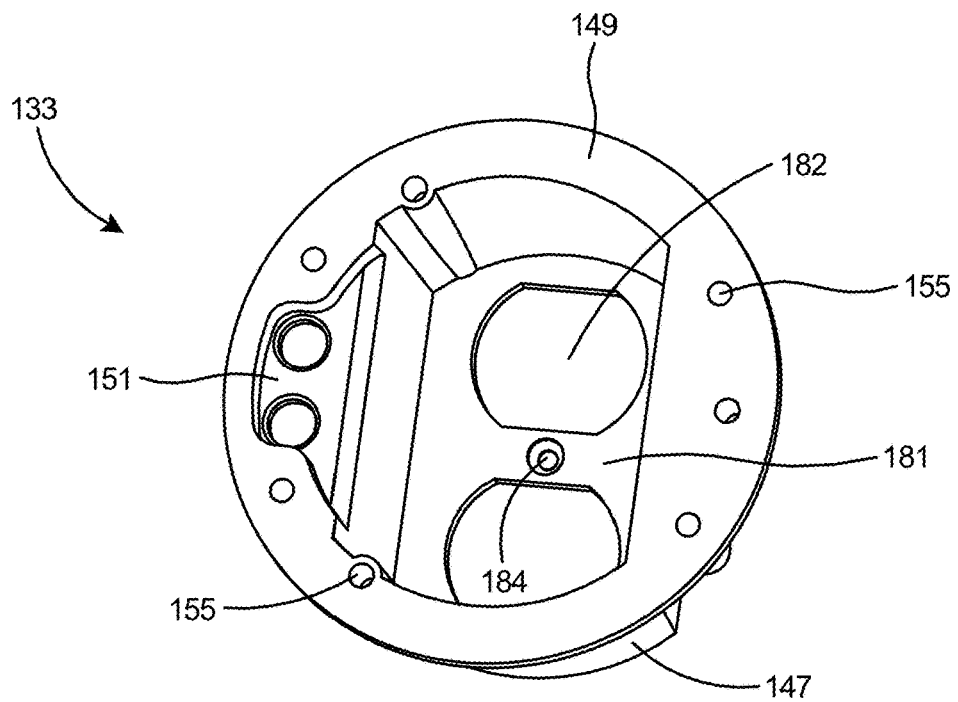
FIG. 24 is a top isometric view of a funnel that forms a portion of the electrical box assembly of FIG. 12.
Figure 25:
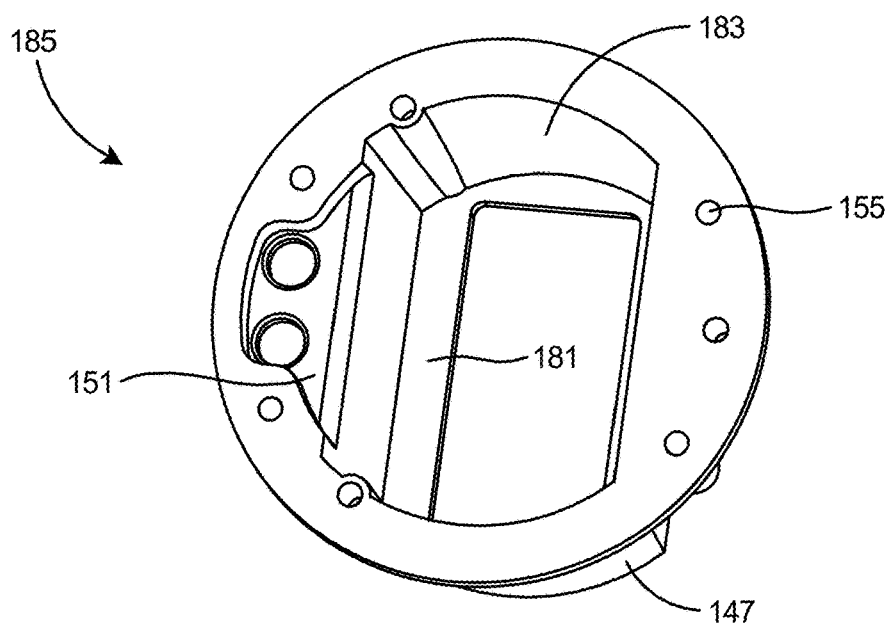
FIG. 25 is a top isometric view of a second embodiment of the funnel.
Figure 26:
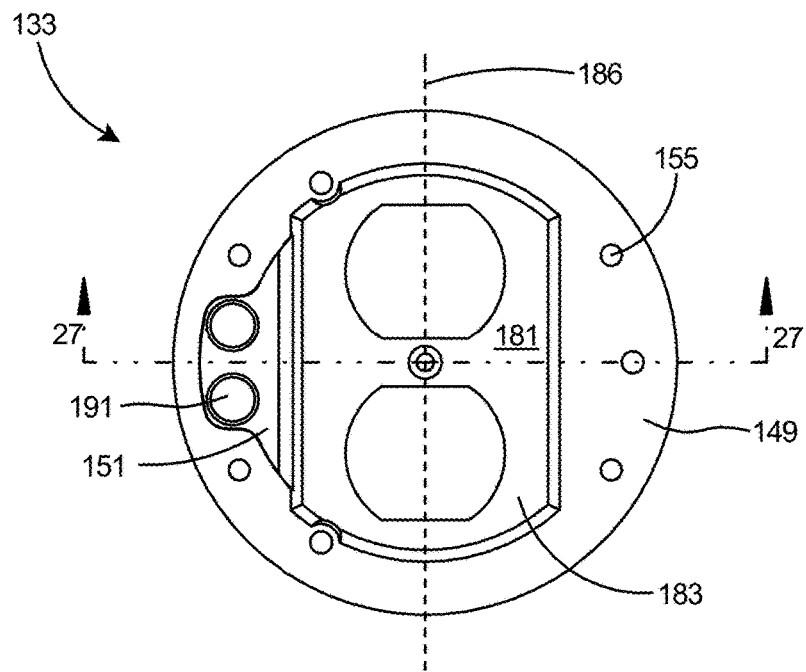
FIG. 26 is a top view of the funnel of FIG. 24.
Figure 27:
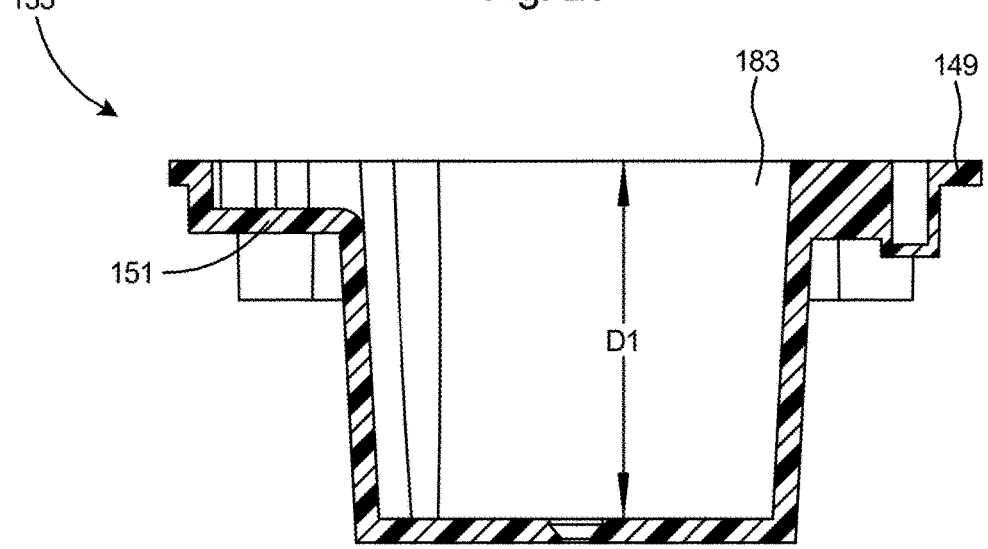
FIG. 27 is a sectional view of the funnel taken along line 27-27 of FIG. 26.

Referring to FIGS. 24-27, funnel 133 further includes sidewalls 180 and a back wall 181 for mounting a high voltage electrical component (not shown) to the funnel and electrical box assembly. Back wall 181 is recessed a substantial distance from flange 149. Deep recess 183 enables mounting of an electrical component 127 (see FIG. 12) a substantial distance within the electrical box thus providing substantial volume for accommodating the plug ends of electrical cords. Back wall 181 of funnel 133 includes an opening 182 for providing access to an electrical outlet (not shown) and an aperture 184 for mounting a component cover plate (not shown). As shown in FIG. 24, funnel 133 may be constructed to accommodate a duplex receptacle or may be a funnel 185 constructed to accommodate a conventional decorative electrical receptacle. As shown in FIG. 26, flange 149 includes bores 155 therein for pass-through of fasteners 139 (see FIG. 12) when mounting trim ring 135 and funnel 133 to the leveling ring 123 to form an electrical box assembly. As shown in FIG. 12, slide member 24 can be inserted into electrical box assembly for dividing the electrical box 22 into a low voltage compartment 187 and a high voltage compartment 189.

As shown in FIG. 26, low voltage ports 191 are provided in the recessed area 151 of funnel 133. Low voltage ports 191 align any low voltage wiring or leads with the low voltage compartment 187. The recess 151 of the funnel is oriented at a right angle with respect to the opening 182 as shown by axis 186 with respect to main axis of sectional line 27-27 extending through recess 151.

Figure 28:
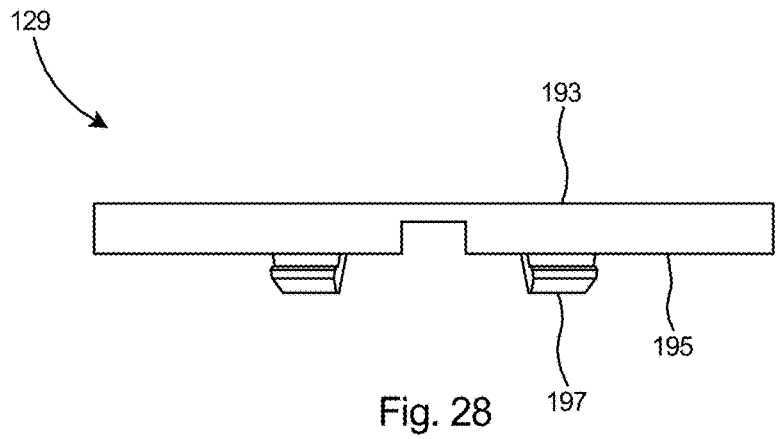
FIG. 28 is a side view of a cover member that forms a portion of the electrical box assembly of FIG. 12.
Figure 29:
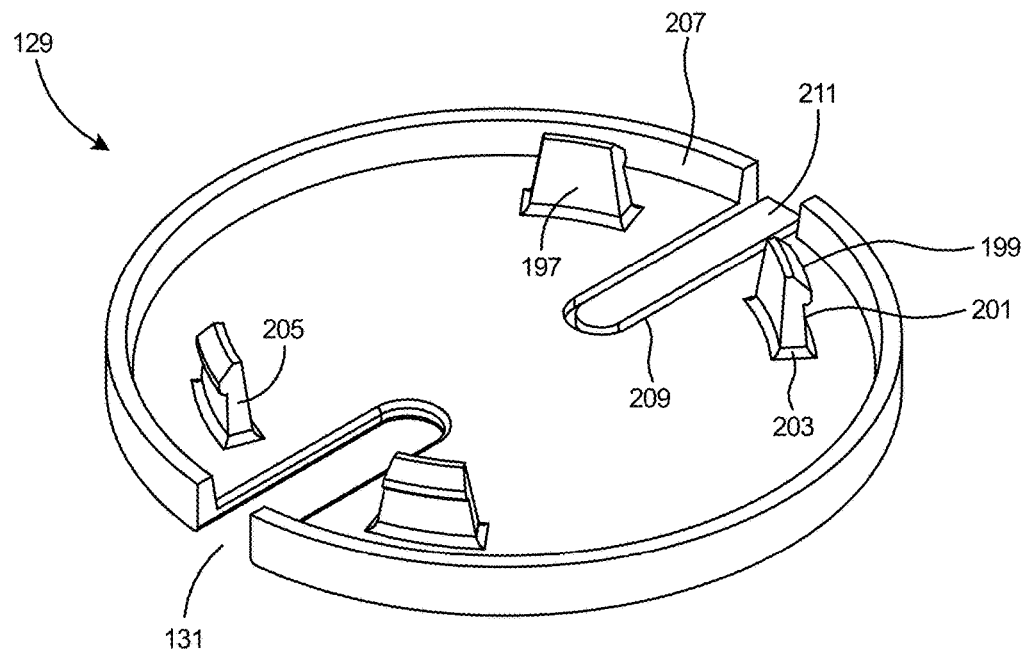
FIG. 29 is a bottom isometric view of the cover member.

With reference to FIGS. 28 and 29, electrical cover 129 includes a top surface 193 and bottom surface 195. Top surface 193 is substantially planar and includes a cord escape slot 131 therein. Cover 129 further includes a plurality of arms 197 extending from the bottom surface. The flexible arms 197 include outward-facing extents 199 defining a seat area 201. Arms 197 enable snap-on connection of cover 129 to electrical box assembly. Pressing cover 129 onto the trim ring 135 (see FIG. 12) enables arms 197 to flex outward and snap onto collar 141 of trim ring. Filets 203 are provided around the base 205 of arms 197 to strengthen arms to enable them to withstand repeated attachments and removals from the electrical box assembly. Snap-on cover 129 further includes a peripheral wall 207 extending from the outer periphery of the bottom surface 195 and grooves 209 in the bottom surface, the grooves defining a weakened wall area 211 that can be removed from the cover to provide a second cord escape slot.

Figure 30:
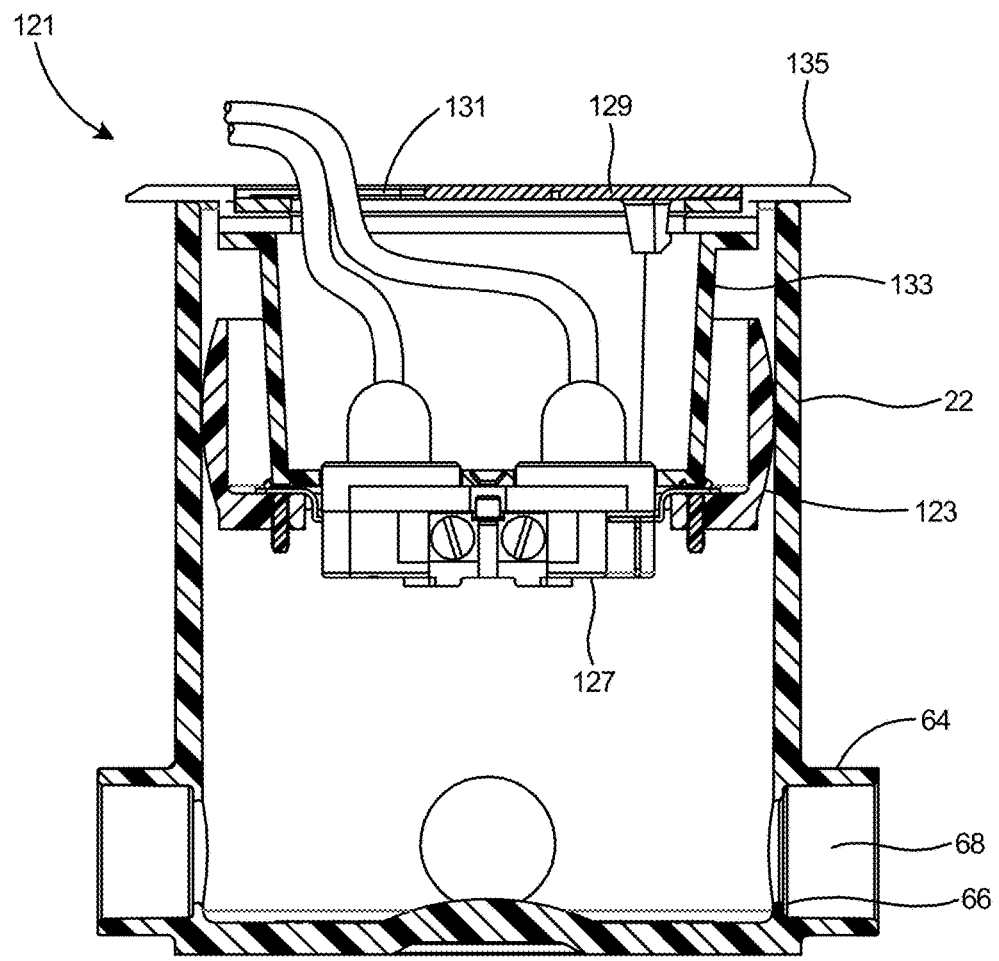
FIG. 30 is a sectional view of the electrical box assembly including two electrical cords plugged into the duplex receptacle that is recessed within the electrical box.

Referring to FIG. 30, when fully installed in the concrete pour area, electrical box assembly 121 enables protective recessed mounting of electrical components, such duplex receptacle 127, well below and level with the surface of the concrete pour. The concrete can 22 enclosures the entire assembly. The leveling ring 123, secured to the can 22 by PVC cement, provides a means of leveling the funnel 133 with respect to the concrete surface. Funnel 133 provides an enclosure for housing the electrical component. Electrical cords 213 may be plugged into the duplex receptacle 127 while in use. The slot 131 in cover 129 provides an opening for the electrical cords to remain plugged in while the cover plate is closed on the can.

With reference to FIG. 12, the electrical box 22 and leveling ring 123 are preferably constructed of plastic, most preferably polyvinyl chloride (PVC). The deep leveling ring 123 is a glue-in ring, the PVC construction enabling the deep leveling ring 123 to be glued to the electrical box 22 with PVC cement. The fasteners 139 (see FIG. 12) mount through the trim ring 135, the funnel 133, and into the bosses 165 (see FIG. 19) on the leveling ring. The funnel 133 is preferably constructed of plastic, most preferably polycarbonate. The gasket 143 is preferably constructed of elastomeric material, such as hard rubber or NEOPRENE®, available from DuPont Company, Wilmington, Del. The cover 129 is preferably constructed of plastic and will snap into the trim ring 135. The trim ring 135 is preferably constructed of metal, most preferably constructed of brass. Preferably, the inserts 113 (see FIG. 8) pressed into apertures 106 in the arms 125 of leveling ring 123 are constructed of metal, most preferably the inserts are constructed of brass.

Having thus described the invention with reference to a preferred embodiment, it is to be understood that the invention is not so limited by the description herein but is defined as follows by the appended claims. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments herein were chosen and described in order to best explain the principles of the invention and the practical application, and to enable others of ordinary skill in the art to understand the invention.

What is claimed is:

1. An electrical box assembly, comprising:
   an electrical box including a sidewall having an inner surface defining an electrical enclosure;
   a leveling ring including an inner periphery and arms extending from the inner periphery;
   a funnel including sidewalls and a back wall with an opening;
   means for securing said funnel to said electrical box, said means of securing said funnel to said electrical box including a trim ring and a fastener for securing through said trim ring, said funnel, and into said leveling ring;
   said funnel including a flange and a recess within said flange;
   said trim ring including a flange and a recess within said flange;
   a collar extending from the inner periphery of said trim ring and a notch in said collar of said trim ring, said collar of said trim ring including a recessed wall;
   bores in said collar of said trim ring; and
   bores in said flange of said funnel, whereby said bores in said collar of said trim ring align with said bores in said flange of said funnel and said notch in said collar of said trim ring aligns with said recess of said funnel.

2. The electrical box assembly of claim 1, further comprising a gasket and a cover plate.

3. The electrical box assembly of claim 1, further comprising a slide for insertion in said electrical box, said slide dividing said enclosure into a high voltage compartment and a low voltage compartment.

4. The electrical box assembly of claim 1, further comprising:
   a bottom wall on said electrical box; and
   a pair of parallel rails on said bottom wall.

5. The electrical box assembly of claim 1, further comprising:
   an arm on said leveling ring; and
   said arm including an aperture therein adapted for connection of an electrical component.

6. The electrical box assembly of claim 1, further comprising:
   said opening in said funnel is oriented along an axis; and
   said recess of said funnel is oriented at a right angle with respect to said axis of said opening in said funnel.

7. An electrical box assembly, comprising:
   an electrical box including a sidewall having an inner surface defining an electrical enclosure;
   a leveling ring including an inner periphery and arms extending from the inner periphery;
   a trim ring;
   a funnel including sidewalls and a back wall with an opening;
   means for securing said funnel to said electrical box;
   a cover plate;
   an arm on said leveling ring;
   said arm including an aperture therein adapted for connection of an electrical component;
   bores in said collar of said trim ring; and
   bores in said flange of said funnel, whereby said bores in said collar of said trim ring align with said bores in said flange of said funnel and said notch in said trim ring aligns with said recess of said funnel.

8. The electrical box assembly of claim 7, wherein said means of securing said funnel to said electrical box further comprises a fastener for securing through said trim ring, said funnel, and into said leveling ring.

9. The electrical box assembly of claim 8, wherein said funnel further comprises:
   a flange; and
   a recess within said flange.

10. The electrical box assembly of claim 9, wherein said trim ring further comprises:
    a flange; and
    a recess within said flange.

11. The electrical box assembly of claim 10, further comprising:
    a collar extending from the inner periphery of said trim ring; and
    a notch in said collar.

12. The electrical box assembly of claim 11, wherein said collar of said trim ring includes a recessed wall.

* * * * *